(12) United States Patent
Kim et al.

(10) Patent No.: US 12,439,112 B2
(45) Date of Patent: Oct. 7, 2025

(54) ELECTRONIC APPARATUS FOR CONTENT PLAYBACK AND METHOD FOR CONTROLLING THEREOF

(71) Applicant: Samsung Electronics Co., Ltd., Suwon-si (KR)

(72) Inventors: Youngjin Kim, Suwon-si (KR); Jongwon Kwak, Suwon-si (KR); Yeonjoon Kim, Suwon-si (KR); Taesoo Kim, Suwon-si (KR); Hyungyeon Kim, Suwon-si (KR); Hyunjin Park, Suwon-si (KR); Suwon Seo, Suwon-si (KR); Byeongcheol Lee, Suwon-si (KR); Dahee Jeong, Suwon-si (KR); Younjeong Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 18/386,485

(22) Filed: Nov. 2, 2023

(65) Prior Publication Data

US 2024/0064368 A1 Feb. 22, 2024

Related U.S. Application Data

(63) Continuation of application No. PCT/KR2023/011512, filed on Aug. 4, 2023.

(30) Foreign Application Priority Data

Aug. 16, 2022 (KR) .................. 10-2022-0102038

(51) Int. Cl.
*H04N 21/262* (2011.01)
*H04N 21/44* (2011.01)

(52) U.S. Cl.
CPC ....... *H04N 21/26258* (2013.01); *H04N 21/44* (2013.01)

(58) Field of Classification Search
None
See application file for complete search history.

(56) References Cited

U.S. PATENT DOCUMENTS 9,066,138 B1 * 6/2015 Kraiman ............ H04N 21/2668
9,075,962 B1 * 7/2015 Lau .......................... H04L 67/02
(Continued)

FOREIGN PATENT DOCUMENTS

| CN | 101883244 B | 1/2013 |
|---|---|---|
| JP | 2017-69683 | 4/2017 |

(Continued)

OTHER PUBLICATIONS

International Search Report, PCT/ISA/210, dated Nov. 15, 2023, in International Application No. PCT/KR2023/011512.

(Continued)

*Primary Examiner* — William J Kim
(74) *Attorney, Agent, or Firm* — STAAS & HALSEY LLP

(57) ABSTRACT

An electronic apparatus that (a) receives first data from a server, the first data including a first section in which first content data of requested content is included and a second section in which advertisement content data is insertable, but is not inserted, (b) controls the display to output a portion of content corresponding to the first content data, (c) receives second data while the portion of the content is being output by the display, the second data including a first section in which second content data of the requested content is included and a second section into which advertisement content data is inserted, and (d) controls the display to output advertisement content corresponding to the advertisement (Continued)

content data inserted into the second section of the received second data, based on a current playback point of the content corresponding to the first content data and the second content data.

11 Claims, 7 Drawing Sheets

(56) References Cited

U.S. PATENT DOCUMENTS

| | | | |
|---|---|---|---|
| 10,354,276 B2 | 7/2019 | Schobeiri et al. | |
| 10,911,813 B1* | 2/2021 | Wu | H04N 21/25808 |
| 2002/0124251 A1* | 9/2002 | Hunter | H04N 21/8358 |
| | | | 348/E7.071 |
| 2005/0060745 A1* | 3/2005 | Riedl | H04N 21/25883 |
| | | | 348/E7.071 |
| 2006/0031892 A1* | 2/2006 | Cohen | H04N 21/472 |
| | | | 348/E7.071 |
| 2006/0248569 A1* | 11/2006 | Lienhart | H04N 5/76 |
| | | | 725/135 |
| 2007/0282898 A1* | 12/2007 | Stark | H04N 21/26258 |
| 2009/0175538 A1* | 7/2009 | Bronstein | H04N 21/44008 |
| | | | 382/173 |
| 2010/0095333 A1* | 4/2010 | Kelly | H04N 21/654 |
| | | | 725/100 |
| 2010/0146542 A1* | 6/2010 | Weihs | H04N 21/43 |
| | | | 725/34 |
| 2010/0178030 A1* | 7/2010 | Colby | H04N 21/812 |
| | | | 386/291 |
| 2010/0223392 A1* | 9/2010 | Pond | H04N 21/6405 |
| | | | 709/231 |
| 2011/0219098 A1* | 9/2011 | Xu | H04L 67/06 |
| | | | 709/219 |
| 2011/0243522 A1* | 10/2011 | Chen | H04N 9/87 |
| | | | 386/219 |
| 2012/0262632 A1* | 10/2012 | Eskenazi | H04H 20/63 |
| | | | 348/E5.114 |
| 2013/0031580 A1* | 1/2013 | Keum | H04L 65/40 |
| | | | 725/32 |
| 2013/0046641 A1* | 2/2013 | DeVree | G06Q 30/0277 |
| | | | 705/14.69 |
| 2013/0332971 A1* | 12/2013 | Fisher | H04N 21/8456 |
| | | | 725/93 |
| 2014/0003501 A1* | 1/2014 | Soroushian | G06F 16/73 |
| | | | 375/E7.243 |
| 2014/0089957 A1 | 3/2014 | Badawiyeh et al. | |
| 2014/0195643 A1* | 7/2014 | Liu | H04N 21/23109 |
| | | | 709/217 |
| 2014/0195651 A1* | 7/2014 | Stockhammer | H04N 21/6125 |
| | | | 709/219 |
| 2014/0245346 A1* | 8/2014 | Cheng | H04N 21/8456 |
| | | | 725/32 |
| 2014/0324603 A1* | 10/2014 | Savkar | H04N 21/254 |
| | | | 705/14.71 |
| 2014/0337868 A1* | 11/2014 | Garza | H04N 21/4223 |
| | | | 725/12 |
| 2015/0033023 A1* | 1/2015 | Xu | H04N 21/8355 |
| | | | 713/176 |
| 2015/0143404 A1* | 5/2015 | Byers | G06Q 30/0207 |
| | | | 725/32 |
| 2017/0359628 A1* | 12/2017 | Sachdev | H04N 21/435 |
| 2019/0098344 A1* | 3/2019 | Shanson | H04N 21/266 |
| 2019/0166412 A1* | 5/2019 | Panchaksharaiah | H04N 21/26258 |
| 2019/0296840 A1* | 9/2019 | Vermeyden | H04N 21/44016 |
| 2020/0059677 A1* | 2/2020 | Park | H04N 21/44222 |
| 2020/0213676 A1* | 7/2020 | Naik Raikar | H04N 21/2387 |
| 2021/0067816 A1* | 3/2021 | Gupta | H04N 21/44016 |
| 2021/0152896 A1* | 5/2021 | Fisher | H04N 21/8586 |
| 2021/0211748 A1* | 7/2021 | Terem | H04N 21/25883 |
| 2021/0256569 A1* | 8/2021 | Shanson | G06Q 30/0277 |
| 2021/0274241 A1* | 9/2021 | Cava | H04N 21/435 |
| 2021/0274245 A1* | 9/2021 | Cava | H04N 21/25435 |
| 2021/0312318 A1* | 10/2021 | Ambrozic | G06N 3/088 |
| 2021/0409816 A1* | 12/2021 | Menon | H04N 21/44209 |
| 2023/0370698 A1* | 11/2023 | Pressnell | H04N 21/26258 |

FOREIGN PATENT DOCUMENTS

| | | |
|---|---|---|
| JP | 2018-201213 | 12/2018 |
| JP | 2019-193204 | 10/2019 |
| KR | 10-0645146 | 11/2006 |
| KR | 10-2014-0142644 | 12/2014 |
| KR | 10-2016-0064564 | 6/2016 |
| KR | 10-1654885 | 9/2016 |
| KR | 10-1666918 | 10/2016 |
| KR | 10-1667921 | 10/2016 |
| KR | 10-1741747 | 5/2017 |
| KR | 10-1909695 | 10/2018 |
| KR | 10-1926891 | 12/2018 |

OTHER PUBLICATIONS

Written Opinion, PCT/ISA/237, dated Nov. 15, 2023, in International Application No. PCT/KR2023/011512.

* cited by examiner

FIG. 5A

```
#EXTM3U
#EXT-X-VERSION:3
#EXT-X-PLAYLIST-TYPE:VOD
#EXT-X-TARGETDURATION:7
#EXT-X-MEDIA-SEQUENCE:1
#EXT-X-DISCONTINUITY-SEQUENCE:0
#EXTINF:6.073
https://dz8y1qdqdo86u.cloudfront.net/KN_S01_E01/media_010_00095.ts
#EXTINF:5.739,
https://dz8y1qdqdo86u.cloudfront.net/KN_S01_E01/media_010_00096.ts    ~510-1
#EXTINF:5.472,
https://dz8y1qdqdo86u.cloudfront.net/KN_S01_E01/media_010_00097.ts
#EXT-X-CUE-OUT:0
#EXT-X-DISCONTINUITY                                                  ~520
#EXT-X-CUE-IN
https://dz8y1qdqdo86u.cloudfront.net/KN_S01_E01/media_020_00001.ts
#EXTINF:5.839,
https://dz8y1qdqdo86u.cloudfront.net/KN_S01_E01/media_020_00002.ts    ~510-2
#EXTINF:6.073,
https://dz8y1qdqdo86u.cloudfront.net/KN_S01_E01/media_020_00003.ts
...
...
...
```

FIG. 5B

```
#EXTM3U
#EXT-X-VERSION:3
#EXT-X-PLAYLIST-TYPE:VOD
#EXT-X-TARGETDURATION:7
#EXT-X-MEDIA-SEQUENCE:1
#EXT-X-DISCONTINUITY-SEQUENCE:0
#EXTINF:6.073
https://dz8y1qdqdo86u.cloudfront.net/KN_S01_E01/media_010_00095.ts
#EXTINF:5.739,
https://dz8y1qdqdo86u.cloudfront.net/KN_S01_E01/media_010_00096.ts      ⎤
#EXTINF:5.472,                                                          ⎬ 510-1
https://dz8y1qdqdo86u.cloudfront.net/KN_S01_E01/media_010_00097.ts      ⎦
#EXTINF:5.472,
https://AD.COM/1.ts                                                     ⎤
#EXTINF:5.472,                                                          ⎬ 530
https://AD.COM/2.ts                                                     ⎦
#EXTINF:6.273,
https://dz8y1qdqdo86u.cloudfront.net/KN_S01_E01/media_020_00001.ts      ⎤
#EXTINF:5.839,                                                          ⎬ 510-2
https://dz8y1qdqdo86u.cloudfront.net/KN_S01_E01/media_020_00002.ts      ⎦
#EXTINF:6.073,
https://dz8y1qdqdo86u.cloudfront.net/KN_S01_E01/media_020_00003.ts
...
...
...
```

ELECTRONIC APPARATUS FOR CONTENT PLAYBACK AND METHOD FOR CONTROLLING THEREOF

CROSS-REFERENCE TO RELATED APPLICATION(S)

This application is a continuation of PCT/KR2023/011512, filed on Aug. 4, 2023, at the Korean Intellectual Property Receiving Office and claims priority under 35 U.S.C. § 119 to Korean Patent Application No. 10-2022-0102038, filed on Aug. 16, 2022, in the Korean Patent Office, the disclosures of all of which are incorporated by reference herein in their entireties.

BACKGROUND

1. Field

Apparatuses and methods consistent with the disclosure relate to an electronic apparatus for content playback and a method for controlling the same, and more particularly, to an electronic apparatus for content playback that provides improved playback performance of a content into which an advertisement is inserted, and a method for controlling the same.

2. Description of Related Art

Conventionally, playback of a content such as video or music has been performed in such a manner that a content file is received from a server to an electronic apparatus, and then played back in a state of being stored in a storage space of the electronic apparatus.

Since then, in accordance with the development of wireless communication technology, there was introduced a streaming method of receiving some of the content files which are small-sized pieces together with header information from the server and immediately playing back the same instead of the method of receiving and playing back all files of the content such as the video or music to be played back from the server.

The content may be provided in a real-time streaming method, thus making it unnecessary for a user of an individual electronic apparatus to receive all content files from the server for content playback. In every case of playing back the content, the user of the individual electronic apparatus may access the server to thus receive and play back some of the content files in real time, and a content provider may not need to uniformly determine content data or advertisement data which may be included in the middle of the content prior to providing the content for the individual user.

Therefore, the content provider may be free to select the content and the advertisement which may be inserted in the middle of the content, and make money while providing a free content, in which the content provider does not receive a license fee from the individual user, through the advertisement inserted in the middle of the content.

However, in case of receiving an advertisement request from the individual electronic apparatus, the conventional technology for streaming the content into which the advertisement is inserted may insert all advertisements in the middle of the content before the streaming, and then stream the content into which the advertisement is inserted, which may require a certain amount of time from the advertisement request to the streaming of the content into which the advertisement is inserted.

In addition, among the conventional technologies, the following technology may enable fast streaming of the content into which the advertisement is inserted with a small amount of time: the technology of inserting the advertisement into the content by requesting the advertisement to the server immediately before streaming a corresponding point for each point where the advertisement may be inserted in the middle of the content while the content is being streamed by the individual electronic apparatus. However, this conventional technology cannot determine how many advertisements to be inserted in the entire content at which points, at the beginning immediately after the content playback starts. Therefore, in case that the user streams the content by the individual electronic apparatus while skipping a certain section of the content, the advertisement may be skipped without being inserted to the point where the advertisement may be inserted in the middle of the content, thus making it difficult to properly expose the advertisement.

Therefore, in order to solve the above problem, there is a need to seek for a method for quickly streaming the content into which the advertisement is inserted, while identifying that how many advertisements are inserted in the entire content at which points, immediately after the content streaming starts, in case of receiving the advertisement request from the individual electronic apparatus.

SUMMARY

According to one or more embodiments of the disclosure, an electronic apparatus includes: a communication interface configured to perform communication connection with a server; a display; and a processor, wherein the processor is configured to perform control to: transmit a request for a content to the server through the communication interface; based on the transmitted request, receive first data from the server through the communication interface, wherein the received first data includes a first section in which first content data of the requested content is included and a second section in which advertisement content data is insertable, but is not inserted; control the display to output a portion of content corresponding to the first content data included in the first section of the received first data; receive second data while the portion of the content corresponding to the first content data is being output by the display, wherein the received second data includes a first section in which second content data of the requested content is included and a second section into which advertisement content data is inserted; and control the display to output advertisement content corresponding to the advertisement content data inserted into the second section of the received second data based on a current playback point of the content corresponding to the first content data and the second content data included in the first section of the received second data.

According to one or more embodiments of the disclosure, the processor may perform control to: identify whether the requested content is provided to a user for a fee; and, based on identifying that the requested content is provided to the user for a fee, control the display to output content corresponding to the second content data included in the first section of the received second data without outputting the advertisement content.

According to one or more embodiments of the disclosure, the advertisement content may be selected based on a real-time simultaneous bidding method.

According to one or more embodiments of the disclosure, the processor may perform control to: identify a playback point of the advertisement content and a playback degree of content including content corresponding to the second content data and the advertisement content based on at least one of the first data or the second data; and control the display to output a user interface (UI) corresponding to the identified playback point and playback degree.

According to one or more embodiments of the disclosure, the UI may be a progress bar including information corresponding to the playback point.

According to one or more embodiments of the disclosure, the apparatus may further include a user interface, wherein the processor is configured to perform control to: receive a user input corresponding to a change in a first playback point of content including content corresponding to the second content data and the advertisement content through the user interface while the playback point of the content including the content corresponding to the second content data and the advertisement content is output through the display; and control the display to output the advertisement content inserted between the first playback point and a second playback point, and then output the content corresponding to the second content data from the second playback point in case that the advertisement content is inserted between the first playback point and the second playback point based on the received user input.

According to one or more embodiments of the disclosure, a method includes, by an electronic apparatus: transmitting a request for a content to a server through a communication interface; based on the transmitted request, receiving first data from the server, wherein the received first data includes a first section in which first content data of the requested content is included and a second section in which advertisement content data is insertable, but is not inserted; controlling a display to output a portion of content corresponding to the first content data included in the first section of the received data; receiving second data while the portion of the content corresponding to the first content data is being output by the display, wherein the received second data includes a first section in which second content data of the requested content is included and a second section into which advertisement content data is inserted; and controlling the display to output advertisement content corresponding to the advertisement content data inserted into the second section of the received second data based on a current playback point of the content corresponding to the first content data and the second content data included in the first section of the received second data.

According to one or more embodiments of the disclosure, the method may further include, by the electronic apparatus, identifying whether the requested content is provided to a user for a fee; and, based on identifying that the requested content is provided to the user for a fee, controlling the display to output content corresponding to the second content data included in the first section of the received second data without outputting the advertisement content.

According to one or more embodiments of the disclosure, the advertisement content may be selected based on a real-time simultaneous bidding method.

According to one or more embodiments of the disclosure, the method may further include, by the electronic apparatus: identifying a playback point of the advertisement content and a playback degree of content including content corresponding to the second content data and the advertisement content based on at least one of the first data or the second data; and controlling the display to output a user interface (UI) corresponding to the identified playback point and playback degree.

According to one or more embodiments of the disclosure, the UI may be a progress bar including information corresponding to the playback point.

According to one or more embodiments of the disclosure, the method in which the electronic apparatus further includes a user interface, may further include receiving a user input corresponding to a change in a first playback point of the second content through the user interface while the playback point of the second content is output through the display, and controlling the display to first output the at least one advertisement content inserted between the first playback point and a second playback point before playing the second content back from the second playback point in case that the at least one advertisement content is inserted between the first playback point and the second playback point of the second content based on the received user input.

BRIEF DESCRIPTION OF THE DRAWINGS

Aspects, features and advantages of specific embodiments of the disclosure will become clearer through the following description provided with reference to the accompanying drawings.

FIG. 5A is a view for explaining first data including a first section in which content data is inserted and a second section into which the advertisement content data is able to be inserted according to one or more embodiments of the disclosure.

FIG. 5B is a view for explaining second data including a first section in which the content data is included and a second section into which the advertisement content data is able to be inserted according to one or more embodiments of the disclosure.

DETAILED DESCRIPTION

Figure 1:
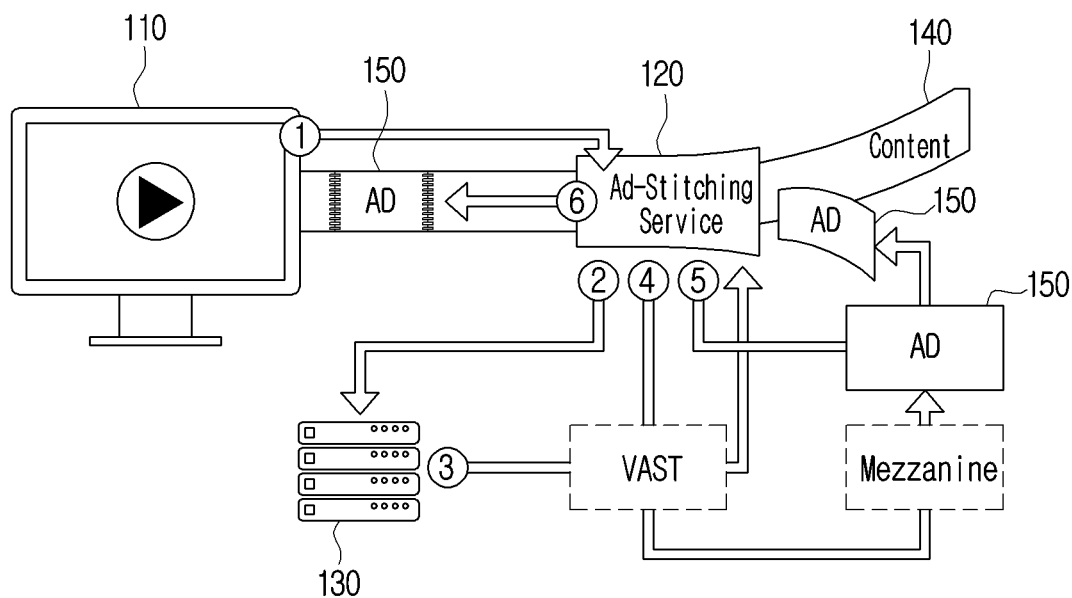
FIG. 1 is a view for explaining a method of inserting an advertisement in the middle of a content provided in a real-time streaming method.

The disclosure may be variously modified and have various embodiments. Therefore, specific embodiments are shown in the accompanying drawings and described in detail in the specification. However, it is to be understood that the scope of the disclosure is not limited to the specific embodiments, and includes various modifications, equivalents or alternatives according to the embodiments of the disclosure. Throughout the accompanying drawings, similar components are denoted by similar reference numerals.

In describing the disclosure, the description omits a detailed description of a case where the detailed description for the known functions or configurations related to the disclosure is determined to unnecessarily obscure the gist of the disclosure.

In addition, the following embodiments may be modified in various different forms, and the scope and spirit of the disclosure are not limited to the following embodiments. Rather, these embodiments are provided to make the disclosure thorough and complete, and to completely transfer the spirit of the disclosure to those skilled in the art.

Terms used in the disclosure are used only to describe the specific embodiments rather than limiting the scope of the disclosure. A term of a singular number may include its plural number unless explicitly indicated otherwise in the context.

In the disclosure, an expression "have," "may have," "include," "may include" or the like, indicates existence of a corresponding feature (for example, a numerical value, a function, an operation or a component such as a part), and does not exclude existence of an additional feature.

In the disclosure, expressions "A or B," "least one of A and/or B," "one or more of A and/or B" and the like, may include all possible combinations of items enumerated together. For example, "A or B," "at least one of A and B" or "at least one of A or B" may indicate all of 1) a case where at least one A is included, 2) a case where at least one B is included, or 3) a case where both of at least one A and at least one B are included.

Expressions "first," "second" and the like, used in the disclosure may indicate various components regardless of a sequence or importance of the components. These expressions are only used in order to distinguish one component from another component, and do not limit the corresponding components.

In case that any component (for example, a first component) is mentioned to be "(operatively or communicatively) coupled with/to" or "connected to" another component (for example, a second component), it is to be understood that any component may be directly coupled to another component or may be coupled to another component through still another component (for example, a third component).

On the other hand, in case that any component (for example, a first component) is mentioned as being "directly coupled" or "directly connected" to another component (for example, a second component), it is to be understood that still another component (for example, a third component) does not exist between any component and another component.

An expression "configured (or set) to" used in the disclosure may be replaced by an expression "suitable for," "having the capacity to," "designed to," "adapted to," "made to" or "capable of" based on a situation. The expression "configured (or set) to" may not necessarily indicate "specifically designed to" in hardware.

Instead, an expression a device "configured to" in any situation may indicate that the device may "perform" together with another device or component. For example, "a processor configured (or set) to perform A, B and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory device.

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and implemented by at least one processor except for a "module" or an "~er/or" that needs to be implemented by specific hardware.

Meanwhile, the drawings schematically show various elements and regions. Therefore, the spirit of the disclosure is not limited by relative sizes or intervals shown in the accompanying drawings.

Hereinafter, the embodiments of the disclosure are described in detail with reference to the accompanying drawings for those skilled in the art to which the disclosure pertains to easily practice the disclosure.

FIG. 1 is a view for explaining a method of inserting an advertisement in the middle of a content provided in a real-time streaming method.

Referring to FIG. 1, an electronic apparatus 110 streaming content may request a content 140 from a streaming server 120 (0). Here, the content 140 may include video, audio, or the like, is not limited thereto, and may include various types of data which may be provided to a user.

The streaming server 120 may request an advertisement server 130 for at least one video ad serving template (VAST) advertisement content 150 to be inserted at the starting point, ending point, or intermediate point of the content 140 (0). The advertisement server 130 may select at least one advertisement through a bidding, and transmit data for the VAST advertisement content 150 to the streaming server 120 (3).

The streaming server 120 may extract mezzanine, which is intermediate data included in the data for the received VAST advertisement content 150, and transcode the same by using the same codec as the content 140 (0). The streaming server 120 may insert the transcoded advertisement content 150 into the starting point, ending point, or intermediate point of the content 140 to be streamed (0).

The electronic apparatus 110 may receive the content 140 into which the advertisement content 150 is inserted from the streaming server 120, and provide the user with the content 140 by streaming and outputting the same (0).

Here, the electronic apparatus 110 or the streaming server 120 may provide an improved streaming speed of the content 140 into which the advertisement content 150 is inserted by inserting the advertisement content 150 into the starting point, ending point, or intermediate point of the content 140 and streaming the same by using a method described below.

Figure 2:
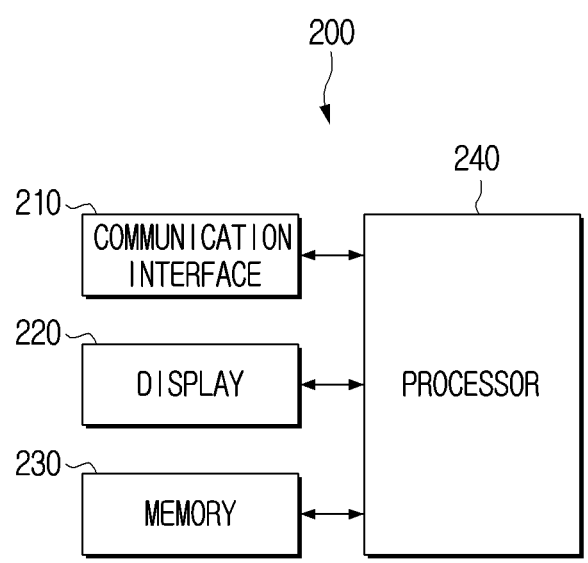
FIG. 2 is a block diagram showing a configuration of an electronic apparatus according to one or more embodiments of the disclosure.

FIG. 2 is a block diagram showing a configuration of an electronic apparatus according to one or more embodiments of the disclosure.

Referring to FIG. 2, an electronic apparatus 200 may be implemented in various devices equipped with a display that may play back video content or output the content through a display, such as a smart television (TV), a tablet personal computer (PC), a monitor, a smartphone, a desktop computer, or a laptop computer. In addition, the electronic apparatus 200 may include at least one of a digital video disk (DVD) player or a media box (e.g., Samsung HomeSync™, Apple TV™, or Google TV™).

The electronic apparatus 200 is not limited to the above-mentioned devices, and may be implemented as having two or more functions of the above-mentioned devices.

In addition, the electronic apparatus 200 may be connected to another external device to perform one or more functions.

The electronic apparatus 200 may include components such as a communication interface 210, a display 220, a memory 230, a processor 240, or the like. However, the electronic apparatus 200 is not limited to including only the above components, and may further include various other components such as an input/output interface, a microphone, a speaker, a user interface, or the like.

The communication interface 210 may include a wireless communication interface 210, a wired communication interface 210, or an input interface. The wireless communication interface 210 may perform communication with various external devices by using wireless communication technology or mobile communication technology. The wireless communication technology may include, for example, Bluetooth, Bluetooth low energy, controller area network (CAN) communication, wireless-fidelity (Wi-Fi), Wi-Fi direct, ultrawide band (UWB) communication, Zigbee, infrared data association (IrDA), near field communication (NFC) or the like, and the mobile communication technology may include 3rd generation partnership project (3GPP), worldwide interoperability for microwave access (Wi-Max), long term evolution (LTE), 5th generation (5G), or the like. The wireless communication interface 210 may be implemented using an antenna, a communication chip, a substrate, or the like, which may transmit an electromagnetic wave to the outside or receive the electromagnetic wave transmitted from the outside.

The wired communication interface 210 may perform the communication with various external devices based on a wired communication network. Here, the wired communication network may be implemented using a physical cable such as a pair cable, a coaxial cable, an optical fiber cable, or an Ethernet cable.

Either one of the wireless communication interface 210 and the wired communication interface 210 may be omitted in some embodiments. Accordingly, the electronic apparatus 200 may include only the wireless communication interface 210 or only the wired communication interface 210. In addition, the electronic apparatus 200 may include an integrated communication interface 210 supporting both wireless access through the wireless communication interface 210 and wired connection through the wired communication interface 210.

The electronic apparatus 200 is not limited to including one communication interface 210 performing one type of communication connection, and may include the plurality of communication interfaces 210.

The processor 240 may communicate with various external apparatuses 200 or servers through the communication interface 210.

In detail, at least one processor 240 included in the electronic apparatus 200 may transmit or receive a request for the content in a wired/wireless manner by performing a communication connection with the external electronic apparatus 200 such as the server or an external display device through the communication interface 210. The processor 240 may receive or transmit content data or advertisement content data in the wired/wireless manner by performing the communication connection with the external electronic apparatus 200 through the communication interface 210. Here, the content may include video data or audio data, and is not limited thereto.

The display 220 may include various types of display panels such as a liquid crystal display (LCD) panel, an organic light-emitting diode (OLED) panel, an active-matrix organic light-emitting diode (AM-OLED), a liquid crystal on silicon (LcoS), and a quantum dot light-emitting diode (QLED), a digital light processing (DLP) panel, a plasma display panel (PDP), an inorganic LED panel, or a micro LED panel, and is not limited thereto.

Meanwhile, the display 220 may be included in a touch screen together with a touch panel, or may be a flexible panel.

The processor 240 may provide the user with the content or the advertisement content by controlling the display 220 to display the content or the advertisement content based on the content data received from the external electronic apparatus 200 such as the server through the communication interface 210.

In addition, the electronic apparatus 200 may be connected to the external display device (e.g., TV, monitor, tablet PC, laptop computer, or desktop computer) in the wired/wireless manner through an input/output interface or the wireless communication interface 210, and the processor 240 may transmit a signal for controlling the external display device to the external display device for the content to be displayed on the external display device and provided to the user. Here, the content may include the video data or the audio data, and is not limited thereto.

In addition, the electronic apparatus 200 may be connected to the external electronic apparatus 200 such as a microphone, a remote control, or a smartphone through at least one communication interface 210, and the processor 240 may receive a signal from the microphone, the remote control, the smartphone, or the like through at least one communication interface.

In the communication interface 210, the communication interface 210 for the communication connection with the server and the communication interface 210 for the communication connection with the server are different types from each other.

The memory 230 may temporarily or non-temporarily store various programs or data, and transfer the stored information to the processor 240 based on an invocation of the processor 240. In addition, the memory 230 may store various types of information required for the operation, processing, or control of the processor 240 in an electronic format.

The memory 230 may include, for example, at least one of a main memory device or an auxiliary memory device. The main memory device may be implemented using a semiconductor storage medium such as a read only memory (ROM) or a random access memory (RAM). The ROM may include, for example, a conventional ROM, an erasable and programmable ROM (EPROM), an electrically erasable and programmable ROM (EEPROM), or a mask ROM. The RAM may include, for example, a dynamic RAM (DRAM) or a static RAM (SRAM). The auxiliary memory device may be implemented using at least one storage medium which may permanently or semi-permanently store data, such as an optical media including a flash memory 230, a secure digital (SD) card, a solid state drive (SSD), a hard disk drive (HDD), a magnetic drum, a compact disc (CD), a digital versatile disc (DVD), a laser disc, or the like, a magnetic tape, a magneto-optical disk, or a floppy disk.

In detail, the memory 230 may store information on the content data received from the external electronic apparatus 200 such as the server, the advertisement content data, a point where the advertisement content may be inserted into the content, a current playback point of the content being output, or a user interface (UI) representing information corresponding to a playback degree of the output content, for example, a progress bar.

The input/output interface (not shown) may be connected to another device separate from the electronic apparatus 200, for example, an external storage device. For example, the input/output interface may be a terminal of a universal serial bus (USB), or may be any of a high definition multimedia interface (HDMI), a mobile high-definition link (MHL), a universal serial bus (USB), a display port (DP), a thunderbolt, a video graphics array (VGA) port, a red-green-blue (RGB) port, a D-subminiature (D-SUB) or a digital visual interface (DVI).

The input/output interface may input/output at least one of a video signal or an audio signal. In some embodiments, the input/output interface may include a port for inputting/outputting only the audio signal and a port for inputting/outputting only the video signal as its separate ports, or may be implemented as a single port for inputting/outputting both the audio signal and the video signal.

The input/output interface may include not only an input port for receiving the input video/audio signal but also an output port for transmitting the video/audio signal to the external electronic apparatus 200.

The processor 240 may be connected to the external electronic apparatus 200 (e.g., TV, monitor, speaker, tablet PC, laptop computer, or desktop computer) through the input/output interface to thus transmit or receive the video/audio signal to be output through the display or the speaker. The processor 240 may be connected to the external electronic apparatus 200 through the input/output interface to thus transmit or receive the video/audio signal to be played back or streamed.

The microphone (not shown) may refer to a module that obtains audio and converts the same into an electrical signal, and may be a condenser microphone, a ribbon microphone, a moving coil microphone, a piezoelectric element microphone, a carbon microphone, or a micro electro mechanical system (MEMS) microphone. In addition, the microphone may be implemented using an omni-directional method, a bi-directional method, a uni-directional method, a sub-cardioid method, a super-cardioid method, or a hyper-cardioid method.

The processor 240 may obtain the audio data through the microphone included in the electronic apparatus 200. Here, the audio data may be a user voice command for outputting the content through the speaker, is not limited thereto, and may include various types of audio.

In detail, the microphone included in the electronic apparatus 200 may digitize an analog voice signal, and the processor 240 may receive the digitized voice signal. The processor 240 may perform the communication connection with an external server through the communication interface 210 to thus transmit the voice signal to the external server.

In addition, the electronic apparatus 200 may be connected to an external microphone device in the wired/wireless manner through the input/output interface or the wireless communication interface 210, and the processor 240 may receive a signal for the audio data from the external microphone device.

The microphone may be positioned in a separate user terminal (not shown) such as the remote control or the smartphone that transmits a signal to the electronic apparatus 200. Here, in case that the user terminal is the smartphone, the smartphone may function as the remote control through a remote control application installed in the smartphone.

The microphone positioned in the separate user terminal such as the remote control or the smartphone may digitize the analog voice signal, and the processor 240 may perform the communication connection with the user terminal through the communication interface 210 to thus receive the digitized voice signal.

The processor 240 may perform the communication connection with the external server through the communication interface 210 to thus transmit the voice signal to the external server.

Here, the server may be a speech-to-text (STT) server (not shown) that converts the voice signal into text. The processor 240 may perform the communication connection with the STT server through the communication interface 210 to thus receive data processed by the STT server and transmit the received data to another server. However, the processor 240 is not limited thereto, and may obtain the data processed through a STT module included in the electronic apparatus 200 without transmitting the voice signal to the external server.

The processor 240 may control the components of the electronic apparatus 200 to perform various operations by using text data obtained from the STT server or the STT module. However, the processor 240 is not limited thereto, may transmit, to the STT server or the external server, the text data obtained by performing the communication connection with the STT server or the external server through the communication interface 210, and control the components of the electronic apparatus 200 to perform various operations such as transmission of a content request signal based on the data received from the STT server or the external server.

The speaker (not shown) may include a tweeter for high-pitched audio playback, a midrange for mid-range audio playback, a woofer for low-pitched audio playback, a subwoofer for extremely low-pitched audio playback, an enclosure for controlling resonance, a crossover network that divides a frequency of the electrical signal input to the speaker for each band, or the like.

The speaker may output the audio signal to the outside of the electronic apparatus 200. The speaker may output the content playback, recording playback, various notification sounds, a voice message, or the like.

The electronic apparatus 200 may include an audio output device such as the speaker, or an output device such as an audio output terminal.

In particular, the processor 240 may control the speaker to output obtained information, information processed/produced based on the obtained information, a response result to a user voice, an operation result, audio included in the advertisement content, audio included in the content to be streamed or played back, or the like, to thus provide the user with the same.

The user interface (not shown) may include a button-type interface, a lever-type interface, a switch-type interface, a touch-type interface, or the like, and the touch-type interface may receive an input by a user touch on the display 220.

The processor 240 may receive an input for changing the current playback point of the content through the user interface.

The processor 240 may control overall operations of the electronic apparatus 200. In detail, the processor 240 may be connected to the components of the electronic apparatus 200 including the memory 230 as described above, and control the overall operations of the electronic apparatus 200 by executing at least one instruction stored in the memory 230 as described above. In particular, the processor 240 may be implemented as one processor 240 or as the plurality of processors 240.

The processor 240 may be implemented in various ways. For example, the processor may be implemented as at least one of an application specific integrated circuit (ASIC), an embedded processor, a microprocessor, a hardware control logic, a hardware finite state machine (FSM) or a digital signal processor (DSP).

Meanwhile, in the disclosure, the processor 240 may include one or more of a central processing unit (CPU), a micro controller unit (MCU), a micro processing unit (MPU), a controller, an application processor (AP), a communication processor (CP), or an advanced RISC machine (ARM) processor, or may be defined by the corresponding term. In addition, the processor may be implemented in a system-on-chip (SoC) or a large scale integration (LSI), in which a processing algorithm is embedded, or may be implemented in the form of a field programmable gate array (FPGA). The processor 240 may perform various functions by executing computer executable instructions stored in the memory 230. In addition, the processor 240 may include at least one of a graphics-processing unit (GPU), a neural processing unit (NPU), or a visual processing unit (VPU), which is a separate artificial intelligence (AI) dedicated processor to perform artificial intelligence functions.

The processor 240 may receive a user input for a request for a first content through the user interface. The processor 240 may transmit the request for the first content to the server by performing the communication connection with the server through the communication interface 210 based on the received user input.

The processor 240 may receive first data including a portion of the first content from the server by performing the communication connection with the server through the communication interface 210.

Here, the first data may include a first section in which the content data is included and a second section into which the advertisement content data is able to be inserted, and the first section may have first content data, and the second section may have no advertisement content data inserted thereto.

The processor 240 may control the display for a portion of the received first content to be output through the display 220. In case that the received first content is the video content, the processor 240 may control the display 220 to display an information of the first content. In addition, in case that the received first content is the audio content, the processor 240 may control the speaker to output the information of the first content as audio.

The processor 240 may receive second data including a portion of a second content including at least one advertisement content and the first content from the server by performing the communication connection with the server through the communication interface 210 while a portion of the first content is output through the display 220.

Here, the second data may include a first section in which the content data is included and a second section into which advertisement content data is able to be inserted, and the first section may have the first content data, and the second section may have at least one advertisement content data inserted thereto.

The processor 240 may identify a current playback point of the first content based on the first data.

The processor 240 may control the display 220 to output a portion of the second content based on the identified current playback point of the first content and the received second data. In case that the received second content is the video content, the processor 240 may control the display 220 to display an information of the second content. In addition, in case that the received second content is the audio content, the processor 240 may control the speaker to output the information of the second content as audio.

The description describes that the operation of the processor 240 as described above is achieved in a manner of transmitting/receiving the signal by performing the communication connection with the server through the communication interface 210, which is not limited thereto, and the processor 240 may output the first content through the display 220 and output the first content and the second content including the advertisement content through the display 220 by using only the components included in the electronic apparatus 200 without interaction with the server through their communication connection.

Hereinafter, the description describes a difference between the operation of at least one processor 240 included in the electronic apparatus 200 and the conventional technology in detail with reference to FIGS. 3 to 5.

Figure 3:
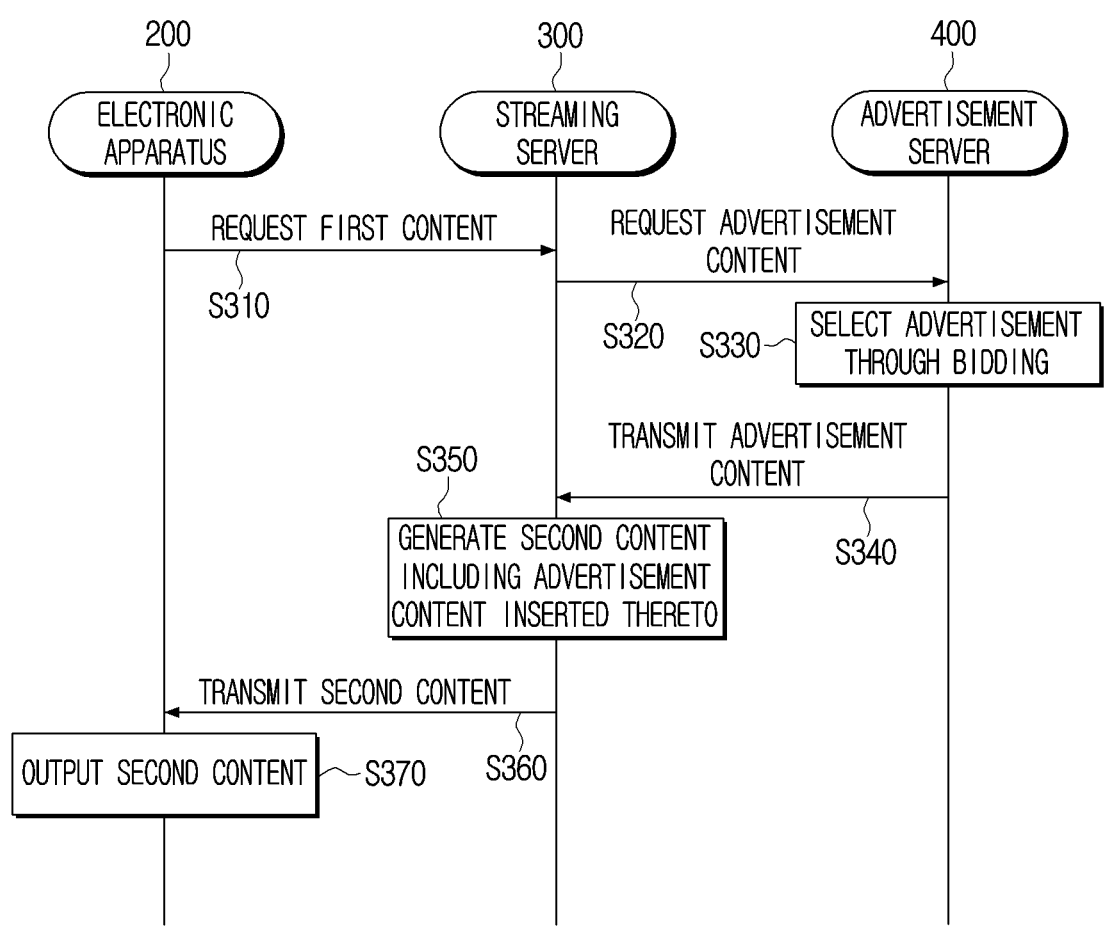
FIG. 3 is a sequence diagram for explaining conventional technology of inserting an advertisement in the middle of a content provided in a real-time streaming method.

FIG. 3 is a sequence diagram for explaining the conventional technology of inserting an advertisement in the middle of a content provided in a real-time streaming method.

Referring to FIG. 3, an electronic apparatus 200 may transmit a request for a first content to a streaming server 300 based on a user input (S310). Here, the electronic apparatus 200 may transmit the request for the first content to the streaming server 300 by performing a communication connection with the streaming server 300 through a communication interface 210.

In case of receiving the request for the first content, the streaming server 300 may transmit a request for an advertisement content to an advertisement server 400 (S320).

In case of receiving the request for the advertisement content, the advertisement server 400 may perform an operation of selecting an advertisement that is provided from an advertisement provider through bidding (S330).

In case that the advertisement is selected through the bidding, the advertisement server 400 may transmit the advertisement content to the streaming server 300 (S340). Here, the advertisement content may include advertisements for various products and services, and may include images, video, and audio.

In case of receiving the advertisement content from the advertisement server 400, the streaming server 300 may generate a second content including the advertisement content inserted thereto (S350).

The electronic apparatus 200 may receive data including the first content and a portion of the second content including at least one advertisement content from the streaming server 300 by performing the communication connection with the streaming server 300 through the communication interface 210 (S360).

The electronic apparatus 200 may output a portion of the second content through a display 220 based on the data received from the streaming server 300 (S370). Here, the electronic apparatus 200 may control the display 220 to display the video of the second content, and control a speaker to output the audio of the second content.

Figure 4:
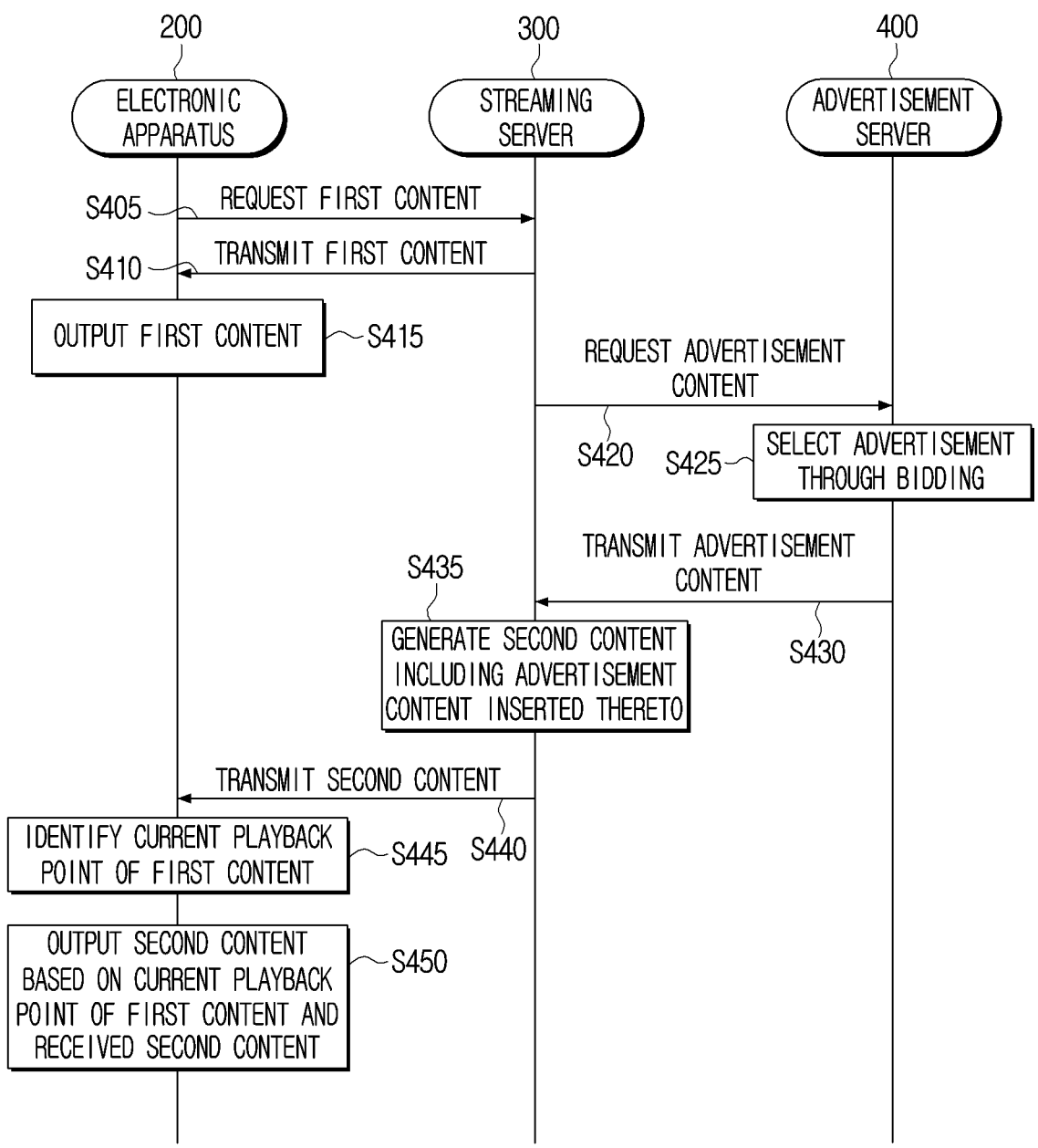
FIG. 4 is a sequence diagram for explaining a method of inserting an advertisement in the middle of a content provided in a real-time streaming method according to various embodiments of the disclosure.

FIG. 4 is a sequence diagram for explaining a method of inserting an advertisement in the middle of a content provided in a real-time streaming method according to various embodiments of the disclosure.

Referring to FIG. 4, the electronic apparatus 200 may receive the user input for the request for the first content. The electronic apparatus 200 may transmit the request for the first content by performing the communication connection with a streaming server 300 through the communication interface 210 (S405).

The electronic apparatus 200 may receive the first data including a portion of the first content from the streaming server 300 by performing the communication connection with the streaming server 300 through the communication interface 210 (S410).

FIG. 5A is a view for explaining the first data including the first section in which the content data is included and the second section into which the advertisement content data is able to be inserted according to one or more embodiments of the disclosure.

Referring to FIG. 5A, the first data may include a first section 510-1 or 510-2 in which the content data is included and a second section 520 into which the advertisement content data is able to be inserted, and the first section 510-1 or 510-2 may have the first content data, and the second section 520 may have no advertisement content data inserted into.

In addition, the first data may include the plurality of first sections 510-1 and 510-2 and the plurality of second sections 520.

The electronic apparatus 200 may output a portion of the first content through the display 220 based on the received first data (S415). Here, the electronic apparatus 200 may control the display 220 to display the video of the first content, and control the speaker to output the audio of the first content.

This configuration is a difference from the conventional technology. The electronic apparatus 200 may quickly output the content through the display 220 without delay occurring due to insertion of the advertisement content into the content by receiving the first content from the streaming server 300 immediately after transmitting the request for the first content to the streaming server 300 and outputting the same through the display 220.

While a portion of the first content is output by the electronic apparatus 200 through the display 220, the streaming server 300 may transmit the request for the advertisement content to the advertisement server 400 (S420). However, the disclosure is not limited thereto, and the electronic apparatus 200 may control the streaming server 300 to transmit the request for the advertisement content to the advertisement server 400. Alternatively, the electronic apparatus 200 may transmit the request for the advertisement content to the advertisement server 400 by directly performing the communication connection with the advertisement server 400 through the communication interface 210.

In case of receiving the request for the advertisement content, the advertisement server 400 may perform the operation of selecting the advertisement through the bidding (S425). However, the disclosure is not limited thereto, and the electronic apparatus 200 may control the advertisement server 400 to perform the operation of selecting the advertisement through the bidding.

Here, at least one advertisement content may be selected based on a real-time simultaneous bidding method for the plurality of advertisement contents. In case that the electronic apparatus 200 or the advertisement server 400 selects an advertisement based on the real-time simultaneous bidding method, it is possible to obtain a maximum profit by selecting an advertisement having a higher price among the plurality of advertisements and inserting the selected advertisement into a section into which the advertisement is able to be inserted.

In case that the advertisement is selected through the bidding, the advertisement server 400 may transmit the advertisement content data to the streaming server 300 (S430). However, the disclosure is not limited to. The electronic apparatus 200 may control the advertisement server 400 to transmit the advertisement content data selected by the advertisement server 400 through the bidding to the streaming server 300, and control the streaming server 300 to receive the advertisement content data selected through the bidding. Alternatively, the electronic apparatus 200 may directly receive the advertisement content data from the advertisement server 400 by performing the communication connection with the advertisement server 400.

The streaming server 300 may generate the second data including a portion of the second content including the advertisement content and the first content based on the received advertisement content data (S435). However, the disclosure is not limited thereto, and the electronic apparatus 200 may control the streaming server 300 to generate the second data a portion of the second content including the first content and the advertisement content. Alternatively, in case of directly receiving the advertisement content data from the advertisement server 400 by performing the communication connection with the advertisement server 400 through the communication interface 210, the electronic apparatus 200 may generate the second data including a portion of the second content including the first content and the advertisement content.

FIG. 5B is a view for explaining the second data including the first section in which the content data is included and a second section into which the advertisement content data is able to be inserted according to one or more embodiments of the disclosure.

Referring to FIG. 5B, the second data may include the first section 510-1 or 510-2 in which the content data is included and a second section 530 into which the advertisement content data is able to be inserted thereto, and the first section 510-1 or 510-2 may have the first content data, and the second section 530 may have at least one advertisement content data inserted into.

In addition, the second data may include the plurality of first sections 510-1 and 510-2 and the plurality of second sections 530. Therefore, at least one advertisement content included in the second data may be each of the plurality of advertisement contents inserted into each of the plurality of second sections 530. Here, in case that the second data includes the plurality of advertisement contents, the plurality of advertisement contents may be simultaneously inserted thereto by the plurality of requests for the advertisement content.

The electronic apparatus 200 may receive the second content data from the streaming server 300 by performing the communication connection with the streaming server 300 through the communication interface 210 (S440).

In case of receiving the second content data, the electronic apparatus 200 may identify the current playback point of the first content based on the first data (S445).

The electronic apparatus 200 may output a portion of the second content through the display 220 based on the identified current playback point of the first content and the received second data (S450). In detail, the processor 240 of the electronic apparatus 200 may identify a portion where similarity between the first data and the second data is greater than or equal to or a predetermined value by comparing the first data including a portion of the first content and the second data including a portion of the second content. The processor 240 of the electronic apparatus 200 may control the display 220 to output a portion of the first content included in the first data until immediately before the point where the similarity between the first data and the second data is identified as greater than or equal to the predetermined value. The processor 240 of the electronic apparatus 200 may control the display 220 to output a portion of the second content included in the second data from the point where the similarity between the first data and the second data is identified as greater than or equal to the predetermined value.

Here, the electronic apparatus 200 may control the display 220 to display the video of the second content, and control the speaker to output the audio of the second content.

Accordingly, the electronic apparatus 200 may output a portion of first content including no advertisement through the display 220 immediately after the request for the first content, the operation of inserting the generated advertisement may be performed while the first content is output by the electronic apparatus 200 through the display 220, and the electronic apparatus 200 may then output the second content including the received advertisement that is inserted thereto through the display 220 following the first content without interruption.

As a result, it is possible to minimize the content playback or output delay caused by time the advertisement is inserted into the content.

In addition, the processor 240 of the electronic apparatus 200 may identify the playback point of at least one advertisement content and a playback degree of the second content based on at least one of the first data or the second data. The processor 240 of the electronic apparatus 200 may control the display to display the UI corresponding to the playback point of the identified at least one advertisement content and playback degree of the second content. For example, the processor 240 may control the display to display the progress bar. Here, the progress bar may basically have a bar shape, is not limited thereto, and may have various shapes such as a circle, an oval, a donut, a square, and a three-dimensional figure.

The processor 240 of the electronic apparatus 200 may receive an input for changing a first playback point of the second content through the user interface while the playback point of the second content is output through the display 220.

The processor 240 of the electronic apparatus 200 may identify a second playback point of the second content based on the received input. The processor 240 of the electronic apparatus 200 may identify whether at least one advertisement content is inserted between the first playback point and the second playback point.

In case of identifying that at least one advertisement content is inserted between the first playback point and the second playback point, the processor 240 of the electronic apparatus 200 may first output at least one advertisement content inserted between the first playback point and the second playback point through the display 220 before playing the second content back from the second playback point.

In addition, the processor 240 of the electronic apparatus 200 may identify whether the first content is a content provided to the user for a fee, and may play back the first content without outputting a separate advertisement content in case that the first content is the content provided to the user for a fee. Therefore, in case that the first content is the content provided for a fee, the processor 240 may have Improved playback speed and processing speed by omitting unnecessary advertisement insertion and the operation of receiving the advertisement content data.

Figure 6:
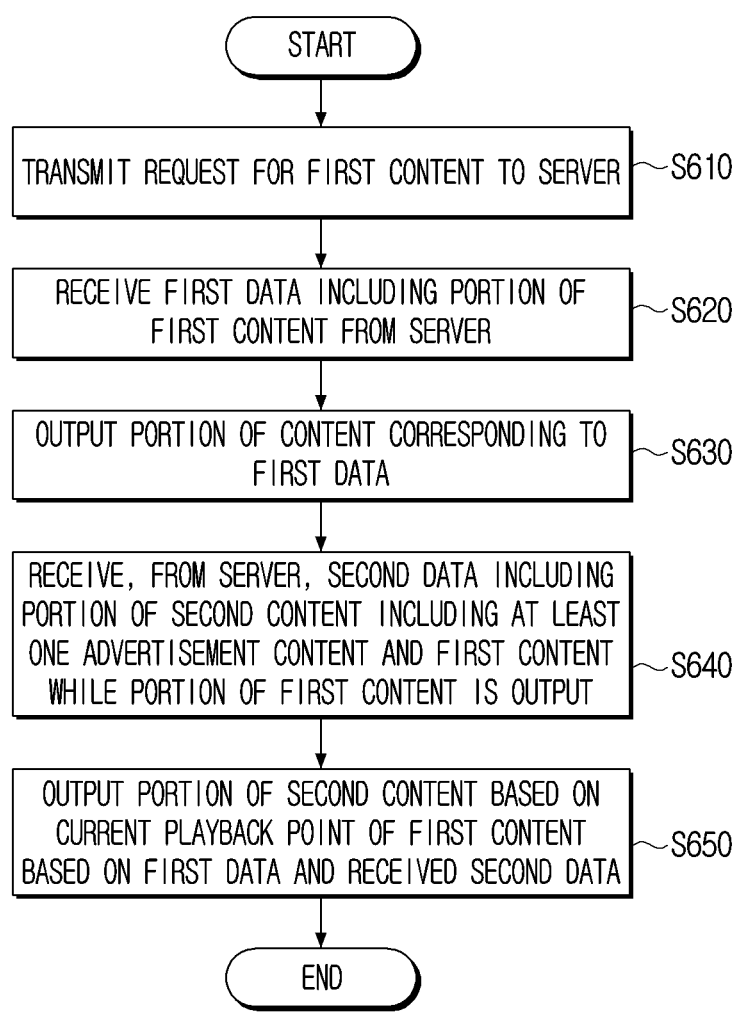
FIG. 6 is a flowchart for explaining an operation of an electronic apparatus according to one or more embodiments of the disclosure.

FIG. 6 is a flowchart for explaining an operation of the electronic apparatus 200 according to one or more embodiments of the disclosure.

The electronic apparatus 200 may transmit the request for the first content to the server (S610).

The electronic apparatus 200 may control the display 220 to receive the first data including a portion of the first content from the server and output a portion of the first content (S620).

The electronic apparatus 200 may receive, from the server, the second data including a portion of the second content including at least one advertisement content and the first content while a portion of the first content is output through the display 220 (S630).

The electronic apparatus 200 may identify the current playback point of the first content based on the first data (S640).

The electronic apparatus 200 may control the display 220 to output a portion of the second content based on the identified current playback point of the first content and the received second data (S650).

According to one or more embodiments, the methods according to the various embodiments disclosed in the disclosure may be included in a computer program product and then provided. The computer program product may be traded as a product between a seller and a purchaser. The computer program product may be distributed in the form of a storage medium (for example, a compact disc read only memory (CD-ROM)) that may be read by a machine, or may be distributed online (for example, downloaded or uploaded) through an application store (for example, PlayStore™) or directly between two user devices (for example, smartphones). In case of the online distribution, at least a part of the computer program product (e.g., downloadable app) may be at least temporarily stored or temporarily provided in the machine-readable storage medium such as a server memory of a manufacturer, a server memory of an application store, or a relay server memory.

Although the embodiments of the disclosure are shown and described hereinabove, the disclosure is not limited to the above-mentioned specific embodiments, and may be variously modified by those skilled in the art to which the disclosure pertains without departing from the scope and spirit of the disclosure as disclosed in the accompanying claims. These modifications also need to be understood to fall within the scope of the disclosure.

What is claimed is:

1. An electronic apparatus comprising:
   a communication interface configured to perform communication with at least one server;
   a display; and
   a processor configured to perform control to:
   transmit a request for a content to the at least one server through the communication interface,
   based on the transmitted request, receive first data from the at least one server through the communication interface, wherein the received first data includes a first section in which first content data of the requested content is included and a second section in which advertisement content data is insertable, but is not inserted,
   control the display to output a portion of content corresponding to the first content data included in the first section of the received first data,
   receive second data from the at least one server through the communication interface while the portion of the content corresponding to the first content data is being output by the display, wherein the received second data includes a first section in which second content data of the requested content is included and a second section into which advertisement content data is inserted, identify a current playback point of the content corresponding to the first content data being output by the display by identifying where a similarity between the content corresponding to the first content data being output by the display and the second data including the second content data is greater than or equal to a predetermined value, and control the display to continue outputting the content corresponding to the first content data up to the identified current playback point and to output content corresponding to the second content data from the identified current playback point and thereafter output content corresponding to the advertisement content data.

2. The electronic apparatus as claimed in claim 1, wherein the processor is configured to perform control to:

identify whether the requested content is provided to a user for a fee, and based on identifying that the requested content is provided to the user for a fee, control the display to output content corresponding to the second content data included in the first section of the received second data without outputting the advertisement content.

3. The electronic apparatus as claimed in claim 1, wherein the advertisement content is selected based on a real-time simultaneous bidding method.

4. The electronic apparatus as claimed in claim 1, wherein the processor is configured to perform control to:

identify a playback point of the advertisement content and a playback degree of content including content corresponding to the second content data and the advertisement content based on at least one of the first data or the second data, and control the display to output a user interface (UI) corresponding to the identified playback point and playback degree.

5. The electronic apparatus as claimed in claim 4, wherein the UI is a progress bar including information corresponding to the playback point.

6. The electronic apparatus as claimed in claim 1, further comprising:

a user interface, wherein the processor is configured to perform control to:

receive a user input corresponding to a change in a first playback point of content including content corresponding to the second content data and the advertisement content through the user interface while the first playback point of the content including the content corresponding to the second content data and the advertisement content is output through the display, and control the display to output the advertisement content inserted between the first playback point and a second playback point, and then output the content corresponding to the second content data from the second playback point in case that the advertisement content is inserted between the first playback point and the second playback point based on the received user input.

7. A method comprising:

by an electronic apparatus, transmitting a request for a content to at least one server through a communication interface configured to communicate with the at least one server, based on the transmitted request, receiving first data from the at least one server through the communication interface, wherein the received first data includes a first section in which first content data of the requested content is included and a second section in which advertisement content data is insertable, but is not inserted, controlling a display to output a portion of content corresponding to the first content data included in the first section of the received first data, receiving second data from the at least one server through the communication interface while the portion of the content corresponding to the first content data is being output by the display, wherein the received second data includes a first section in which second content data of the requested content is included and a second section into which advertisement content data is inserted, identifying a current playback point of the content corresponding to the first content data being output by the display by identifying where a similarity between the content corresponding to the first content data being output by the display and the second data including the second content data is greater than or equal to a predetermined value, and controlling the display to continue outputting the content corresponding to the first content data up to the identified current playback point and to output content corresponding to the second content data from the identified current playback and thereafter output content corresponding to the advertisement content data point.

8. The method as claimed in claim 7, further comprising: by the electronic apparatus, identifying whether the requested content is provided to a user for a fee, and based on identifying that the requested content is provided to the user for a fee, controlling the display to output content corresponding to the second content data included in the first section of the received second data without outputting the advertisement content.

9. The method as claimed in claim 7, wherein the advertisement content is selected based on a real-time simultaneous bidding method.

10. The method as claimed in claim 7, further comprising: by the electronic apparatus, identifying a playback point of the advertisement content and a playback degree of content including content corresponding to the second content data and the advertisement content based on at least one of the first data or the second data, and controlling the display to output a user interface (UI) corresponding to the identified playback point and playback degree.

11. The method as claimed in claim 10, wherein the UI is a progress bar including information corresponding to the playback point.

* * * * *